United States Patent
Tsai et al.

(10) Patent No.: US 7,808,865 B2
(45) Date of Patent: Oct. 5, 2010

(54) METHOD FOR ESTIMATING POWER COMPENSATION AND RECORDING POWER OF A TILTING DISK

(75) Inventors: Chin-Yin Tsai, Taipei (TW); Yi-Lin Lai, Taipei (TW)

(73) Assignee: Via Technologies, Inc., Taipei (TW)

( * ) Notice: Subject to any disclaimer, the term of this patent is extended or adjusted under 35 U.S.C. 154(b) by 1167 days.

(21) Appl. No.: 11/396,661

(22) Filed: Apr. 4, 2006

(65) Prior Publication Data

US 2007/0230294 A1 Oct. 4, 2007

(51) Int. Cl.
*G11B 15/62* (2006.01)
(52) U.S. Cl. ............ 369/53.19; 369/44.29; 369/44.32; 369/44.33; 369/44.31; 369/44.35; 369/53.23; 369/53.28; 369/47.5; 369/47.51; 369/47.52; 369/47.53; 369/116
(58) Field of Classification Search ............ 369/44.29, 369/44.32, 53.19
See application file for complete search history.

(56) References Cited

U.S. PATENT DOCUMENTS 7,366,069 B2 * 4/2008 Kun-Yi .................... 369/53.19
2002/0126605 A1 * 9/2002 Lee et al. ................. 369/53.19
2003/0223337 A1 * 12/2003 Kimura et al. ........... 369/53.19
2006/0114774 A1 * 6/2006 Kun-yi .................... 369/44.32

FOREIGN PATENT DOCUMENTS

JP 11-213413 A 8/1999

\* cited by examiner

*Primary Examiner*—Daniell L Negrón
*Assistant Examiner*—Ifedayo Iluyomade
(74) *Attorney, Agent, or Firm*—Muncy, Geissler, Olds & Lowe, PLLC

(57) ABSTRACT

The method for estimating recording power Pow_tilting of a tilting part of a tilting disk is shown based on a power compensation formula: Pow_comp=A*(A*K). After a focus error (FE) signal of the tilting part of the tilting disk is manipulated as a focus servo output (FOO) signal, the parameter A is derived by low-pass filtering the FOO signal. Thereafter, another parameter K is then derived from a reference lookup table by using curve fitting approach based on parameter A such that the power compensation Pow_comp could be estimated by substituting parameters A and K into the above formula. A recording power Pow_tilting of the tilting part of the tilting disk could be estimated by adding a given recording power Piwrtpwr to the power compensation Pow_comp.

10 Claims, 3 Drawing Sheets

METHOD FOR ESTIMATING POWER COMPENSATION AND RECORDING POWER OF A TILTING DISK

BACKGROUND OF THE INVENTION

1. Field of the Invention

The present invention relates to a recording and reproducing system; more particularly to a method for estimating power compensation and recording power of a tilting disk of the recording and reproducing system.

2. Description of the Related Art

Recordable media such as CD-Rs, CD-RWs, DVD-Rs, or DVD±RWs, and those recording and reproducing systems, e.g., CD-RW, DVD+RW, or DVD-RW drives and players, used for accessing data from the media are more commonly employed than before. Basically, a recording power of the recording and reproducing system is preset before the aforementioned optical disk is recorded, and then data would be formed as different length of pits (or lands) in the corresponding target tracks of the optical disk. If the recording power do not precisely control, pit lengths could be unusual longer or shorter than the normal, and pit depth might also be unusual deeper or shallower, which might result in recording failure and accompany with reading error.

Orange Book is the standard of both CD-R and CD-RW, in which a method of adjusting recording power called Running OPC (Optimum Power Calibration) is introduced. By employing the Running OPC approach, the recording and reproducing system could dynamically adjust recording power when the presetting recording power is improper.

Sometimes, a bad designed recording and reproducing system might result a loaded disk being tilted from a normal position. In such a tilting disk condition, besides the presetting recording power, additional power compensation should be taken into consideration. As the mention above, Running OPC is a selection of power compensation, however, the conventional Running OPC could be only used for overcoming disadvantages arisen from non-uniform dyes spreading, known defects, or some other environmental reasons. That is, the conventional Running OPC is useless with regard to a tilting disk resulted from bad designed recording and reproducing system.

SUMMARY OF THE INVENTION

The present invention provides a method for estimating power compensation and recording power of a tilting part of a tilting disk. A power compensation formula: Pow_comp=A*(A*K) is introduced in the invention.

The disclosed method for estimating recording power Pow_tilting of a tilting part of a tilting disk is shown as follows. A focus error (FE) signal of the tilting part of the tilting disk is manipulated to derive a focus servo output (FOO) signal firstly. After a parameter A in the introduced compensation formula is derived by low-pass filtering the focus servo output signal, another parameter K is also derived from a reference lookup table by curve fitting parameter A. A power compensation Pow_comp could be estimated by substituting parameters A and K into the above formula, and a recording power Pow_tilting of the tilting part of the tilting disk could be estimated by adding a given recording power Piwrtpwr to the power compensation Pow_comp.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention provides a solution of estimating power compensation, and accordingly provides a solution of estimating recording power. When a tilting disk takes place due to the bad design of recording and reproducing system, the power compensation and recording power of the tilting part of the tilting disk could be estimated, and recording power could be precisely controlled so that data could be correctly written.

An embodiment is given as follows to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest herein disclosed. To estimate power compensation, a power compensation formula: Pow_comp=A*(A*K) is firstly introduced. The parameter A is a DC value of a tilting part of the tilting disk, which indicates a relationship of the vertical height of the tilting part in comparison with a base point (which recording power is Piwrtpwr) of the tilting disk, and parameter K is an experimental value. Before recording a disk, a reference lookup table showing the relationship between parameters A and K is preset according to experiments. The method for estimating power compensation Pow_comp of a tilting part of a tilting disk of the present invention is shown as follows. A focus error (FE) signal of a tilting part of the tilting disk is compensated as a focus servo output (FOO) signal firstly. Thereafter, after the parameter A is derived by low-pass filtering the FOO signal, the parameter K is then derived from the reference lookup table by using curve fitting approach based on parameter A. Finally, the power compensation Pow_comp could be estimated by substituting parameters A and K into the power compensation formula aforementioned. Additionally, although the reference lookup table described above shows the relationship of parameters A and K, the reference lookup table could also show the relationship between A and the multiplication parameter A*K.

Figure 1:
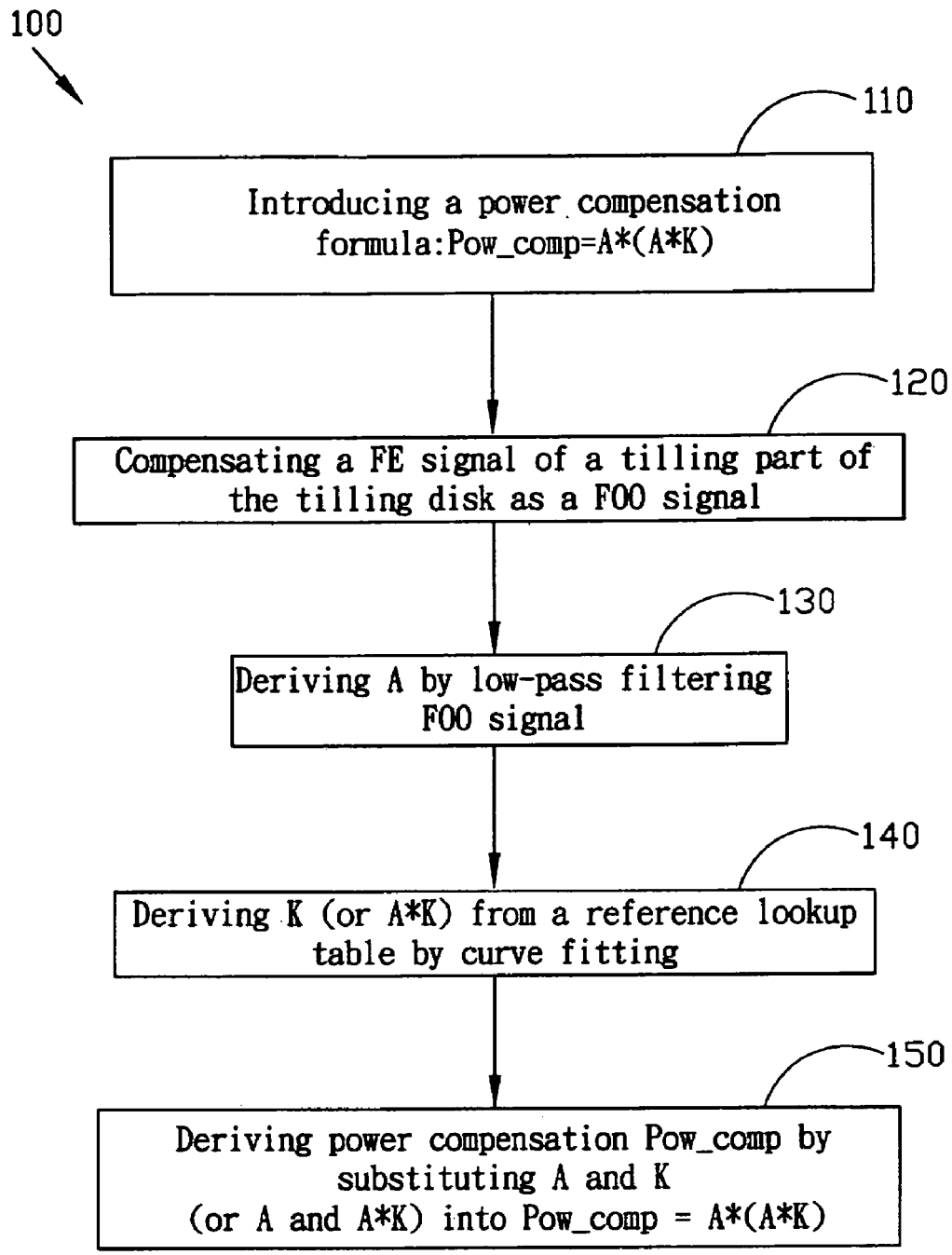
FIG. 1 is a flowchart of estimating power compensation of the present invention.

A flowchart of the disclosed method for power compensation 100 is shown in FIG. 1:

110: introducing a power compensation formula: Pow comp=A*(A*K);

120: compensating a FE signal of a tilting part of the tilting disk as a FOO signal;

130: deriving parameter A by low-pass filtering FOO signal;

140: deriving parameter K (or A*K) from a reference lookup table by using curve fitting approach based parameter A (or multiplication parameter A*K); and 150: deriving power compensation Pow_comp of the tilting part of the tilting disk by substituting parameters A and K (or multiplication parameter A*K) into the power compensation formula:

$$Pow\_comp=A*(A*K).$$

After the power compensation Pow_comp is obtained, a recording power Pow_tilting of the tilting part of the tilting disk could be estimated by adding a given recording power Piwrtpwr to the power compensation Pow_comp. That is, the recording power Pow_tilting of the tilting part of the tilting disk is equal to:

$$Pow\_tilting=Piwrtpwr+Pow\_comp=Piwrtpwr+A*(A*K).$$

Figure 2:
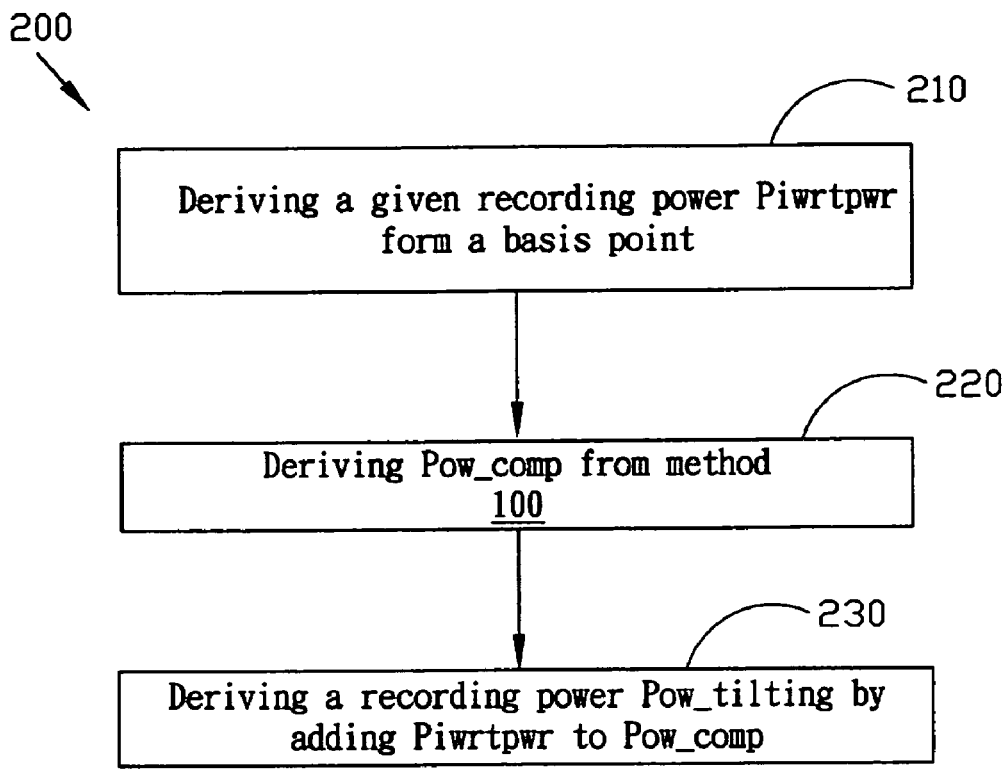
FIG. 2 is a flowchart of estimating recording power of a tilting part of a tilting disk of the present invention.

A flowchart of the method for estimating recording power of a tilting part of the tilting disk 200 is shown in FIG. 2:

210: deriving a given recording power Piwrtpwr form a base point;

220: deriving a power compensation Pow_comp of the tilting part of the tilting disk from the above flow 100; and 230: deriving a recording power Pow_tilting of the tilting part of the tilting disk by adding Piwrtpwr to Pow_comp.

Figure 3:
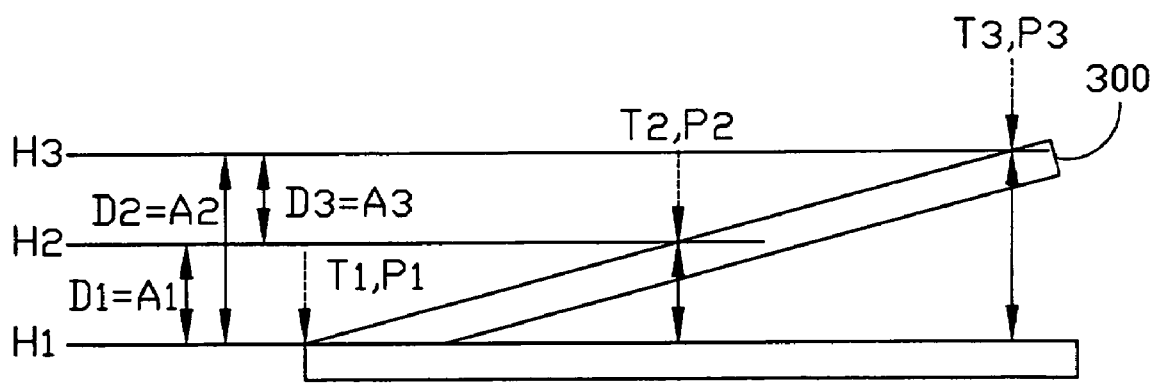
FIG. 3 is a diagram of estimating recording power of the present invention.

FIG. 3 shows an exemplary tilting disk 300, where $T_1$, $T_2$, and $T_3$ are individual tilting points on the disk.

Figure 4:
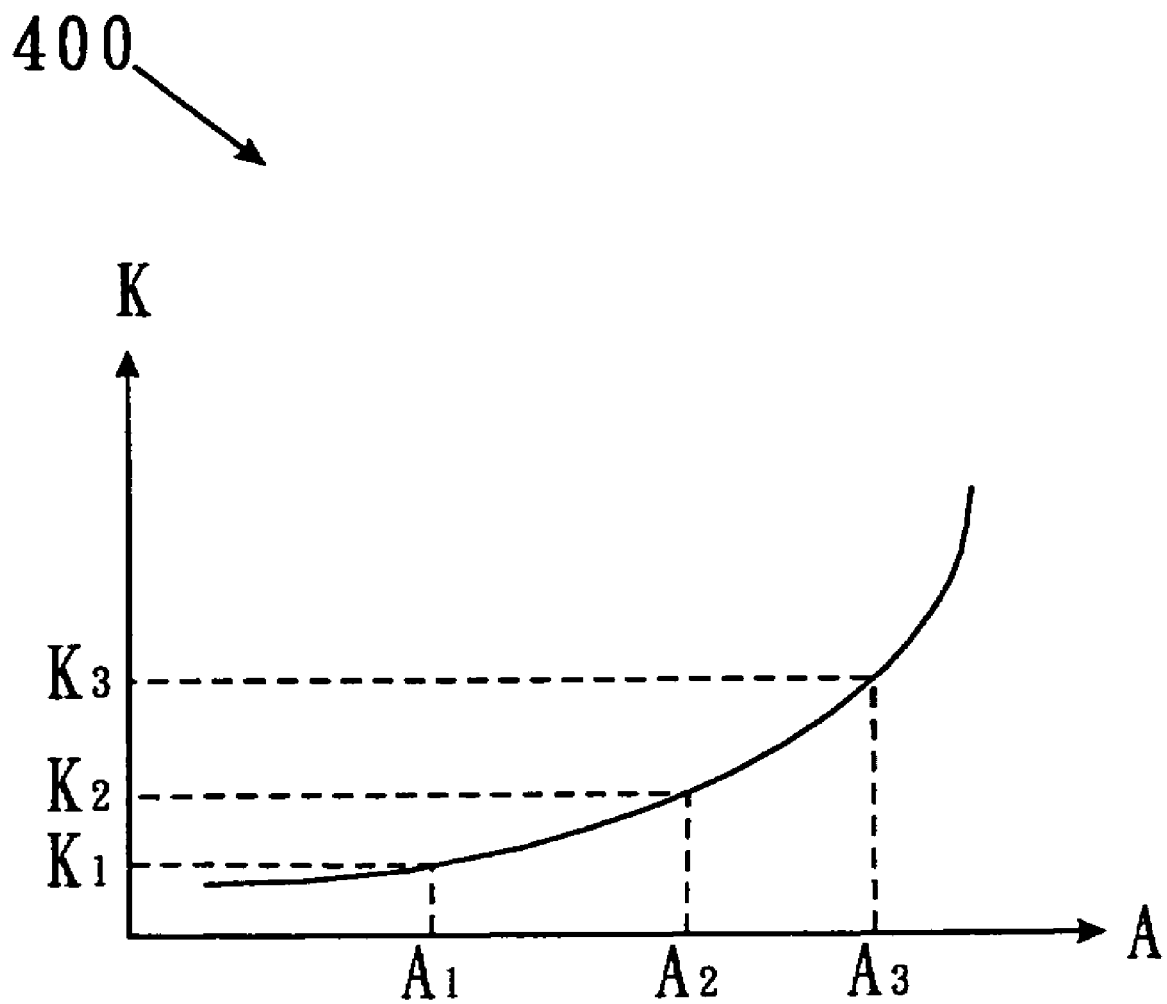
FIG. 4 is a reference table illustrating the relationship between parameters K and A according to the present invention.

In the first embodiment, the point $T_1$ with a height $H_1$ is taken as a base, and the point $T_2$ with a height $H_2$ is then taken as one tilting part of the tilting disk 300. A vertical difference $D_1$ is therefore derived by taking the height difference between $T_1$ and $T_2$ ($D_1=|H_1-H_2|$). Assume $T_1$ is the first track where data is firstly written into of the tilting disk 300 and the recording power of $T_1$ is a given recording power $P_1$ ($P_1$ could be derived from the information of lead-in area or from some other given recording power). Therefore, by using the power compensation formula described above, the power compensation $P_{2\_comp}$ of $T_2$ is equal to:

$$A_2*(A_2*K_2)$$

where parameter $A_2$ is a DC value deriving from compensating and low-pass filtering a FE signal of $T_2$. Accordingly, parameter $A_2$ also indicates what height should the pickup head be pushed from $H_1$ to $H_2$, i.e., $A_2$ is equal to $D_1$. Parameter $K_2$ could be derived from a reference table 400 as shown in FIG. 4. Please note that FIG. 4 shows a relationship of parameters A and K, however, the reference table 400 is not limited to show the relationship of parameters A and K. A relationship of the parameter A and a multiplication parameter A*K could also be shown in the reference table 400. As a result, the recording power $P_2$ of $T_2$ could be estimated by using:

$$P_2=P_1+P_{2\_comp}=P_1+A_2*(A_2*K_2).$$

In the second embodiment, the tilting point $T_3$ with a height is $H_3$ is taken as another tilting part of the tilting disk 300, and then a vertical height $D_2$ is derived by calculating the height difference between $T_1$ and $T_3$ ($D_2=|H_1-H_3|$). Assume $T_1$ is the first track where data is firstly written into of the tilting disk and the recording power of $T_1$ is a given recording power $P_1$ ($P_1$ could be derived from the information of lead-in area or from some other given recording power). Similarly, by using the power compensation formula described above, the power compensation $P_{3\_comp}$ of $T_3$ is equal to:

$$A_3*(A_3*K_3)$$

where parameter $A_3$ is a DC value derived from compensating and low-pass filtering a FE signal of $T_3$. Accordingly, parameter $A_3$ also indicates what height should the pickup head be pushed from $H_1$ to $H_3$, that is, $A_3$ is equal to $D_2$. Similarly, parameter $K_3$ could be derived from a reference table 400 as shown in FIG. 4. Although in this embodiment, FIG. 4 shows a relationship of parameters A and K, however, the reference table 400 is not limited to show the relationship of parameter A and parameter K. A relationship of the parameter A and a multiplication parameter A*K could also be shown in the reference table 400. As a result, the recording power $P_3$ of $T_3$ could be estimated as:

$$P_3=P_1+P_{3\_comp}=P_1+A_3*(A_3*K_3).$$

In the second embodiment described above, although $T_1$ is taken as a base point of the tilting disk, however, if the recording power $P_2$ of $T_2$ is already known (or some other points of already known recording power), a vertical height $D_3$ would become the height difference between $T_2$ and $T_3$ ($D_3=|H_2-H_3|$, and equal to $A_4$) and thus the power compensation $P'_{3\_comp}$ is equal to $A_4*(A_4*K_4)$. As a result, the recording power $P'_3$ of $T_3$ could also be obtained as:

$$P'_3=P_2+P'_{3\_comp}=P_2+A_4*(A_4*K_4)$$

and the result of $P'_3$ would be equal to $P_3$.

When recording a tilting disk, resulting from bad designed recording and reproducing system, power compensation should be taken into consideration. As the descriptions above, the present invention provides a method for estimating power compensation, and for estimating recording power of the tilting part of the tilting disk. Recording power could be precisely controlled and data could be correct written by employing the approach of the invention.

Finally, those skilled in the art should appreciate that they can readily use the disclosed conception and specific embodiment as a base for designing or modify other structures for carrying put the same purpose of the present invention without departing from the spirit and scope of the invention as defined by the appended claims.

What is claimed is:

1. A method for estimating recording power of a tilting part of an optical disk, comprising:

deriving a focus servo output signal from a focus error signal of the tilting point;

deriving a first parameter by low-pass filtering the focus servo output signal;

deriving a second parameter from a reference lookup table by using the first parameter;

deriving a power compensation of the tilting point according to the first parameter and the second parameter; and deriving a recording power of the tilting point according to the power compensation of the tilting point and a given recording power of a base point based on a predetermined power compensation formula.

2. The method of claim 1, wherein the power compensation of the tilting point is added with the given recording power of a base point as the recording power of the tilting point.

3. The method of claim 1, wherein the reference lookup table shows a relationship of the first parameter and the second parameter.

4. The method of claim 1, the reference lookup table shows a relationship of the first parameter and a multiplication parameter that indicates a multiplication of the first parameter and the second parameter.

5. The method of claim 1, wherein the method is applied to a recording and reproducing system selected from a CD-RW, a DVD+RW, or a DVD-RW drive.

6. A method of estimating power compensation of a tilting part of a tilting disk, comprising:

deriving a focus servo output signal from a focus error signal of the tilting point;
deriving a first parameter by low-pass filtering the focus servo output signal;
deriving a second parameter from a reference lookup table by using the first parameter;
deriving a power compensation of the tilting point according to the first parameter and the second parameter based on a predetermined power compensation formula.

7. The method of claim 6, wherein the power compensation of the tilting point is added with the given recording power of a base point as the recording power of the tilting point

8. The method of claim 6, wherein the reference lookup table is preset and shows a relationship of the first parameter and the second parameter.

9. The method of claim 6, wherein the reference lookup table shows a relationship of the first parameter and a multiplication parameter indicating a multiplication of the first parameter and the second parameter.

10. The method of claim 6, wherein the method is applied to a recording and a reproducing system selected from: a CD-RW, a DVD+RW, or a DVD−RW drive.

* * * * *